United States Patent
Hardwick et al.

(10) Patent No.: US 9,827,551 B2
(45) Date of Patent: Nov. 28, 2017

(54) FLUE GAS PURIFICATION SYSTEM AND PROCESS USING A SORBENT POLYMER COMPOSITE MATERIAL

(71) Applicant: W. L. Gore & Associates, Inc., Newark, DE (US)

(72) Inventors: Steve Hardwick, Newark, DE (US); Xiao-Chun Lu, Hockessin, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 15/051,853

(22) Filed: Feb. 24, 2016

(65) Prior Publication Data

US 2016/0250619 A1    Sep. 1, 2016

Related U.S. Application Data

(60) Provisional application No. 62/126,080, filed on Feb. 27, 2015.

(51) Int. Cl.
| | |
|---|---|
| *B01D 53/50* | (2006.01) |
| *B01D 53/64* | (2006.01) |
| *B01D 53/81* | (2006.01) |
| *B01D 53/82* | (2006.01) |
| *B01J 20/26* | (2006.01) |

(52) U.S. Cl.
CPC ............ *B01J 20/261* (2013.01); *B01D 53/50* (2013.01); *B01D 53/508* (2013.01); *B01D 53/64* (2013.01); *B01D 53/81* (2013.01); *B01D 2257/302* (2013.01); *B01D 2257/602* (2013.01)

(58) Field of Classification Search
CPC .. B01D 53/50; B01D 53/64; B01D 2257/602; B01D 53/81; B01D 2257/302; B01D 53/508; B01D 53/82; B01J 20/261; B01J 20/26
See application file for complete search history.

(56) References Cited

U.S. PATENT DOCUMENTS

| | | | |
|---|---|---|---|
| 6,132,692 A | 10/2000 | Alix et al. | |
| 7,442,352 B2 * | 10/2008 | Lu | B01D 53/02 423/210 |
| 8,524,186 B2 | 9/2013 | Kawamura et al. | |

(Continued)

FOREIGN PATENT DOCUMENTS

| | | | | |
|---|---|---|---|---|
| CN | 103387499 A | * | 11/2013 | ........... C07C 211/63 |
| CN | 103845987 A | * | 6/2014 | ............. B01D 53/14 |

OTHER PUBLICATIONS

International Search Report and Written Opinion for Application No. PCT/US2016/019446 dated Jul. 28, 2016 (15 pages).

(Continued)

*Primary Examiner* — Timothy Vanoy
(74) *Attorney, Agent, or Firm* — Kilpatrick Townsend & Stockton, LLP

(57) ABSTRACT

This invention provides a method of removing sulfur oxides, mercury vapor and other contaminants from a flue gas stream and a flue gas treatment device comprising a sorbent polymer composite substrate comprising a high surface area support and a durable halogen source adjacent the sorbent polymer composite substrate. The halogen source comprises a compound with a quaternary ammonium halogen salt that is not washed away.

34 Claims, 6 Drawing Sheets

(56) References Cited

U.S. PATENT DOCUMENTS

| | | |
|---|---|---|
| 2007/0196255 A1 | 8/2007 | Sherman et al. |
| 2010/0204357 A1 | 8/2010 | Chasser et al. |
| 2011/0076210 A1 | 3/2011 | Pollack et al. |
| 2013/0330257 A1 | 12/2013 | Tramposch |
| 2014/0186243 A1 | 7/2014 | Li et al. |
| 2015/0050202 A1 | 2/2015 | Filippelli et al. |

OTHER PUBLICATIONS

Harris, Quantitative Analysis, 6th Ed., W. H. Freeman & Co., NY, p. 142-143.

* cited by examiner

Direction of Uniaxial Expansion

FLUE GAS PURIFICATION SYSTEM AND PROCESS USING A SORBENT POLYMER COMPOSITE MATERIAL

FIELD

The present invention relates generally to the field of pollution control systems and methods for removing sulfur oxides, mercury vapor, and fine particulate matters from industrial flue gases, such as coal-fired power plant flue gas.

BACKGROUND

Coal-fired power generation plants, municipal waste incinerators, and oil refinery plants generate large amounts of flue gases that contain substantial varieties and quantities of environmental pollutants, such as sulfur oxides ($SO_2$, and $SO_3$), nitrogen oxides (NO, $NO_2$), mercury (Hg) vapor, and particulate matters (PM). In the United States, burning coal alone generates about 27 million tons of $SO_2$ and 45 tons of Hg each year.

Regulations limiting emissions of mercury from coal-fired power plants are scheduled to take effect in the United States in 2016. Presently there are two commonly accepted methods for compliance with these regulations. The first involves addition of a brominated salt, such as calcium bromide to the pulverized coal. Upon combustion, bromine combines with mercury to produce a volatile mercuric bromide. Mercuric bromide is readily soluble in water and is efficiently captured in downstream scrubbers provided for flue gas desulfurization. Alternatively, a second method involves active carbon powder continuously injected into the flue gas. Activated carbons are reasonably effective in capturing elemental mercury. Injection typically occurs immediately upstream of unit operations designed to capture fly ash. Such operations may consist of an electrostatic precipitator or a fabric filter. Carbons injected to control elemental mercury emissions are also captured in the electrostatic precipitator or the fabric filter.

There are problems associated with existing methods of mercury control. In the case of the addition of brominated salts to the coal, bromine is produced in excess. Damage due to corrosion by bromine and hydrogen bromide is a risk that accompanies the use of this method. In the case of injection of powdered activated carbon, control of high levels of mercury may require large injection rates. This is especially true where high sulfur coal is combusted and there is a high SOx content in the flue gas. Further, injected carbon is captured with the fly ash, and high levels of injection may compromise the value of the fly ash, for example for sale into concrete.

It would be desirable to have a system and method of removing elemental mercury, sulfur oxides and other contaminants, which does not suffer from the drawbacks of the current methods, which introduce bromine into the hot flue gas, and which require large quantities of consumable carbon.

U.S. Pat. No. 6,132,692, discloses a process for reducing multiple pollutants (particles, Hg, NOx, and $SO_2$) whereby an electrical barrier discharge reactor produces HgO and acids $HNO_3$ and $H_2SO_4$, and a wet electrostatic precipitator (ESP) collects the HgO, acids, and particulates. The collected pollutants are then drained from the wet ESP for further processing. However, the $SO_2$ and NOx removal efficiencies of this process are limited, the system is expensive, energy input is very high, and the collected acid solution may need treatment as liquid waste.

Use of a fixed bed adsorbent would seem to provide an attractive alternative. However, the use of fixed beds has heretofore been limited, due primarily to short adsorbent life. A fixed bed may need to operate without maintenance for a period of 1-3 years. In practical applications the life of a carbon adsorbent is typically too short to provide the necessary lifetime. Carbons can be treated with a variety of chemicals to improve the overall capacity. However, the actual lifetime is often limited by the accumulation of acid caused by oxidation of sulfur dioxide in the flue gas by activated carbon.

In order to overcome the effect of acid accumulation due to $SO_2$ oxidation, Lu et al. (U.S. Pat. No. 7,442,352 B2, hereinafter '352 patent) proposed use of sorbent polymer composites where activated carbon is combined in a hydrophobic polytetrafluoroethylene (PTFE) matrix, which acts as a "reverse sponge", expelling acid as it is formed. The use of this novel sorbent polymer composite provides additional benefits. It can be fabricated into honeycomb shapes to provide highly efficient mercury capture with lower pressure drops than can be obtained through packed, granular beds of carbon. In order to increase the capacity of sorbent polymer composites a variety of halogen containing salts were used.

U.S. Pat. No. 8,524,186 B2 describes a carbon-based catalyst for flue gas desulfurization and method of producing the same and use thereof for removing mercury in flue gas. Limitations exist with this system to provide the levels of free iodine & bromine needed to treat the continuous stream of mercury. The iodine and bromide disclosed in the prior art are leached away in the processes discussed above.

In order to preserve the long term effectiveness of sorbent polymer composites, it would be desirable to have a carbon formulation which contained halogen salts capable of improving the effectiveness of mercury capture, but which are not easily lost through leaching.

There is a need to provide an improved durable system that can simultaneously remove multiple flue gas pollutants such as SOx, lig vapor, and PM2.5 with low cost. It is desirable that the system is simple, does not generate secondary pollutants, and has the capability of producing a useful end product. In particular it would be ideal to develop a system that can provide a source of halogen (iodine and bromine compounds) in the required amount for a prolonged period of time. More specifically, a more durable and longer lasting halogen source in combination with a sorbent polymer composite substrate is desirable that does not get leached away in solutions developed in the treatment process.

SUMMARY

The present invention is directed to new and improved flue gas treatment devices and methods of treating flue gases. Embodiments of the present invention will be described in the following specification, accompanying drawings, and appended claims.

In one embodiment, a flue gas treatment device comprising a sorbent polymer composite (SPC) substrate comprising a composite of a high surface area support and a hydrophobic polymer, and a halogen source located adjacent to the SPC substrate where the halogen source has a Langmuir equilibrium constant greater than 10 is provided. As described in more detail herein, the Langmuir equilibrium constant is a measure of the affinity of a species to be adsorbed.

With respect to the halogen source being located adjacent the polymeric substrate and sorbent material within the flue gas treatment device, the term "adjacent" as used herein is intended to encompass any number of configurations to place the halogen source on or near the sorbent material and polymeric substrate. For example, the halogen source may be placed adjacent the sorbent polymer composite substrate by any suitable technique which may include, but not be limited to, imbibing, impregnating, adsorbing, mixing, sprinkling, spraying, dipping, painting, coating, ion exchanging or otherwise applying the halogen source to the sorbent polymer composite substrate. In an alternative embodiment, the halogen source may be located within the sorbent material, such as within any porosity of the sorbent material. Alternatively, the halogen source may be provided in a solution which may, under system operation conditions, in situ contact the sorbent polymer composite substrate.

Suitable hydrophobic polymers for use in the SPC substrate include, but are not limited to, fluoropolymers such as polytetrafluoroethylene (PTFE), fluoroethylene propylene (FEP), perfluoroacrylate, perfluoroalkoxy alkanes (PFA), polyvinylidene fluoride (PVDF), a terpolymer of tetrafluoroethylene, hexafluoropropylene and vinylidene fluoride (THV), and polychloro trifluoro ethylene (CFE), and other copolymers or terpolymer fluoromonomers and other non-fluorinated monomers. In one embodiment, a suitable hydrophobic polymers suitable for the substrate may comprise expanded fluoropolymers such as ePTFE.

Suitable high surface area sorbent materials for use in the SPC substrate include, but are not limited to, any high surface area activated carbon derived from virtually any source, including, for example, coal-derived carbon, lignite-derived carbon, wood-derived carbon, coconut-derived carbon, as well as other carbonaceous materials with high surface area. While all of these will provide effective mercury scavengers, carbons possessing an iodide number in excess of 500 are generally preferred.

In an alternative embodiment, the high surface area support of the flue gas treatment device comprises activated carbon. In a further embodiment, the activated carbon of the high surface area support of the flue gas treatment device may be selected from the group consisting of a coal-based carbon, wood-based carbon, coconut-based carbon, and activated carbon derived from other carbonaceous materials.

In another embodiment, the halogen source of the flue gas treatment device is selected from tetrabutylammonium iodide, tetrabutylammonium tri-iodide, tetrabutylammonium tri-bromide, or tetrabutylammonium bromide. In another embodiment, the halogen source is a compound with a formula: $N(R_1R_2R_3R_4)X$, where N is nitrogen and $X=I^-$, $Br^-$, $I_3^-$, $BrI_2^-$, $Br_3^-$, $Br_3^-$ and where $R_1$, $R_2$, $R_3$ and $R_4$ are selected from the group consisting of a hydrocarbon having from about 1 to about 18 carbon atoms where the hydrocarbon may be a simple alkyl, including but not limited to, linear or branched alkyl.

In a further embodiment, the halogen source may comprise a tri-halide where the tri-halide is formed from its halide precursor by acid treatment in the presence of an oxidizer. In a further embodiment, the halogen source is a tri-halide where the tri-halide is formed from its halide precursor by acid treatment in the presence of an oxidizer selected from the group consisting of hydrogen peroxide, alkali metal persuifate, alkali metal monopersulfate, potassium iodate, potassium monopersulfates, oxygen, iron (Ill) salts, iron (III) nitrate iron (III) sulfate, iron (III) oxide and combinations thereof.

In another embodiment, a process for removing sulfur oxides and mercury vapor from a gas stream comprising (1) passing the gas stream containing sulfur oxides and mercury vapor over a sorbent polymer composite substrate and a halogen source in the presence of oxygen and water vapor, the sorbent polymer composite substrate comprising a high surface area support, and the a halogen source being adjacent the sorbent polymer composite substrate, wherein the halogen source has a Langmuir equilibrium constant greater than 10, (2) reacting the sulfur oxides with the oxygen and water vapor on the sorbent polymer composite substrate to form sulfuric acid; and (3) reacting the mercury vapor with the halogen source and chemically adsorbing and fixing molecules of the mercury vapor on the sorbent polymer composite substrate is provided. In an alternative embodiment, the process may include adding water vapor to the gas stream upstream of the sorbent polymer composite substrate.

In a further alternative embodiment, a process for removing sulfur oxides and mercury vapor from a flue gas stream comprising (1) passing the gas stream containing sulfur oxides and mercury vapor over a sorbent polymer composite substrate and a halogen source in the presence of oxygen, and water vapor, the sorbent polymer composite substrate comprising a high surface area support, and the a halogen source being adjacent the sorbent polymer composite substrate, where the halogen source has a formula: $N(R_1R_2R_3R_4)X$, where N is nitrogen and $X=I^-$, $Br^-$, $I_3^-$, $BrI_2^-$, $Br_2I^-$, $Br_3^-$ and where $R_1$, $R_2$, $R_3$ and $R_4$ are selected from the group consisting of a hydrocarbon having from about 1 to about 18 carbon atoms and the hydrocarbon is a alkyl, (2) reacting the sulfur oxides with the oxygen and water vapor on the sorbent polymer composite substrate to form sulfuric acid, and (3) reacting the mercury vapor with the halogen source and chemically adsorbing and fixing molecules of the mercury vapor on, the sorbent polymer composite substrate is provided.

Depending on the particular requirements and, aspects of a given system, in certain embodiments, the halogen source may be applied to the sorbent polymeric substrate by imbibing, impregnating, adsorbing, mixing, sprinkling, spraying, dipping, painting, coating, ion exchanging and/or combinations thereof.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Figure 1:
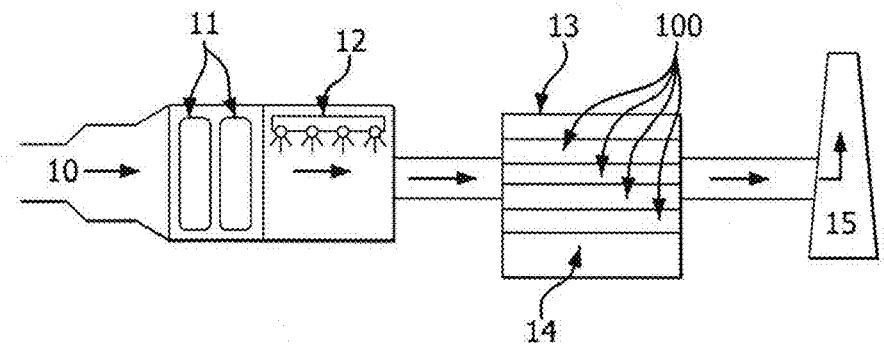
FIG. 1 is an exemplary schematic illustration of a flue gas treatment unit.

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

Referring to FIG. 1, there is shown a schematic of a flue gas treatment unit, where the flue gas 10 from a combustor is reduced in temperature by heat exchangers and introduced in an electrostatic precipitator or bag house 11. After passing through the electrostatic precipitator or bag house 11 to remove particulates, the treated flue gas is further reduced in temperature by unit 12. In one embodiment unit 12 is a water spray which will additionally increase gas humidity. In an alternative embodiment, unit 12 may be in the form of a limestone scrubber for the removal of $SO_2$. The treated flue gas is then introduced into a sorbent house 13 that includes the sorbent polymer composite substrate 100. In an alternative embodiment (not shown), the sorbent house may conveniently be located at the top of the limestone scrubber. Referring again to FIG. 1, $SO_2$ and $SO_3$ are converted to sulfuric acid on the sorbent polymer composite substrate 100 surface, and any mercury vapor in the treated flue gas 10 is absorbed onto the sorbent polymer composite substrate 100. The expelled sulfuric acid will drip down to the acid reservoir 14, together with any trapped fine particles. Finally the treated flue gas exits the sorbent house 13 and exits the stack 15.

Figure 2:
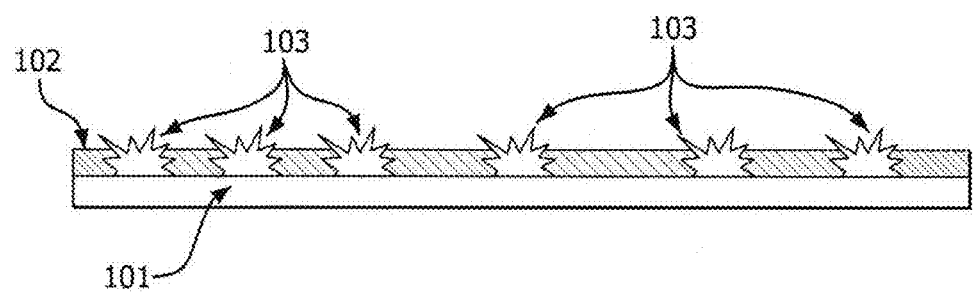
FIG. 2 is an exemplary illustration of a section of a sorbent polymer composite in accordance with at least one embodiment.

FIG. 2 shows one embodiment for use in a flue gas treatment device, where the cross sectional configuration of a sorbent polymer composite 100 is depicted. In this configuration a sorbent material 102 (such as activated carbon) partially or completely covers a polymeric substrate 101 (such as a nodal structure of ePTFE—other examples are provided in the following paragraphs) to form a sorbent composite polymer substrate 99. A halogen source 103 partially or completely covers the sorbent material 102. In a an exemplary embodiment, the halogen source 103 is imbibed into the pores of the sorbent material 102.

Examples of polymeric substrate 101 include fluoropolymers such as polytetrafluoroethylene (PTFE), fluoroethylene propylene (FEP), perfluoroacrylate, perfluoroalkoxy alkanes (PFA), polyvinylidene fluoride (PVDF), a terpolymer of tetrafluoroethylene, hexafluoropropylene and vinylidene fluoride (THV), and polychoro trifluoro ethylene (CFE), and other copolymer or terpolymer fluoromonomers and other non-fluorinated monomers. In certain embodiments, a particularly suitable substrate 101 may comprise expanded fluoropolymers such as ePTFE.

Examples of sorbent material 102 include a high surface area material imbibed or mixed in a low surface energy polymeric substrate 101 such as PTFE to form the sorbent composite polymer (SPC) substrate 99. Non-limiting examples of high surface area materials include activated carbons (e.g., activated carbons derived from coal, lignite, wood, coconut shell and other carbonaceous materials), silica gel, and zeolite. While all of these high surface area materials will provide effective mercury scavengers, carbons possessing an iodide number in excess of 500 are generally preferred.

Figure 3:
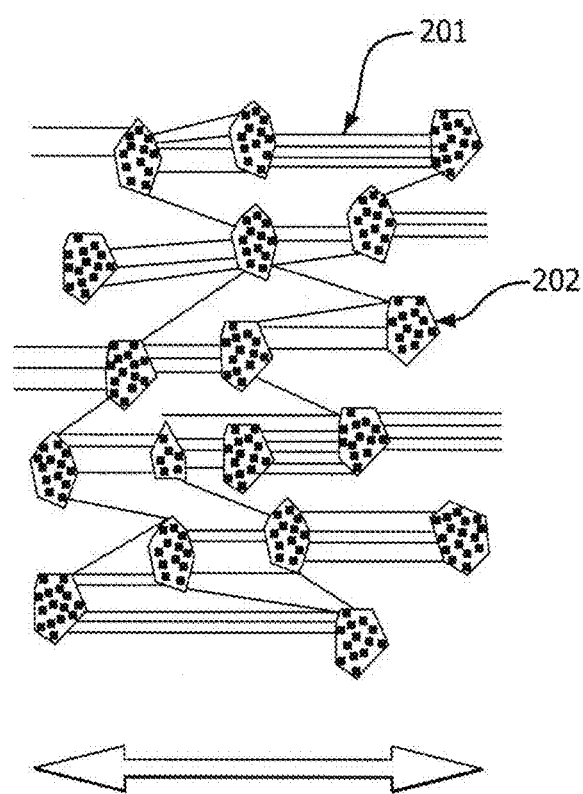
FIG. 3 is an exemplary illustration of a section of activated carbon on a polymeric substrate in accordance with at least one embodiment.
Figure 3A:
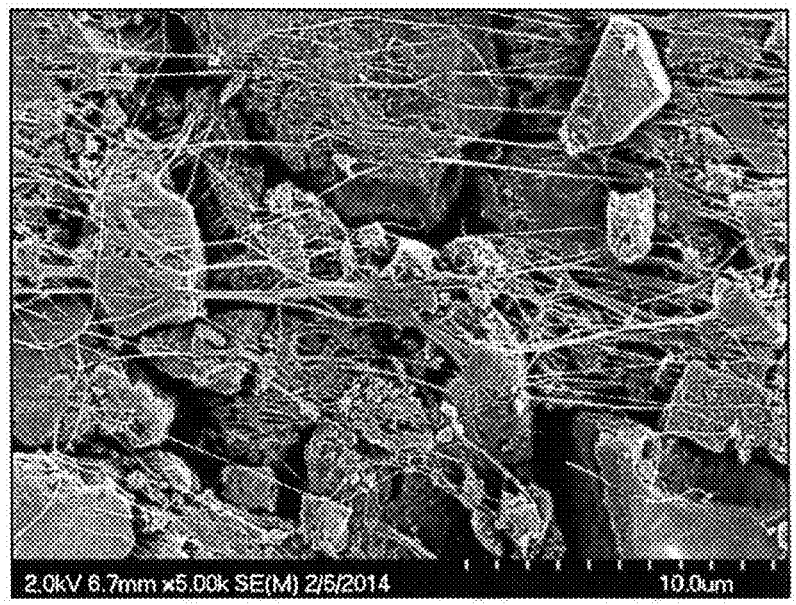
FIG. 3A is an SEM photomicrograph taken at 5000× magnification of a section of the sorbent polymer composition in accordance with at least one embodiment.

In one alternative embodiment, the sorbent in the sorbent composite polymer substrate is activated carbon and the polymer is a fluoropolymer of PTFE. By incorporating the activated carbon into the PTFE, the activated carbon not only retains its physical and chemical properties, but it also gains advantages in cleanliness, chemical inertness and water repellency. In addition, when the activated carbon is incorporated in the polymer, it is easier to handle. The structure of the PTFE is advantageous in that, upon stretching, the fluoropolymer becomes porous, with micropores formed between polymer fibrils and nodes, depending upon the stretching conditions used. When activated carbon or other high surface area adsorbents are mixed with the PTFE, the resulting mixture can be stretched to form a porous structure. In this case, the polymer nodes at least partially include the activated carbon, as shown in FIG. 3, where the activated carbon particles 202 and the PTFE fibrils 201 are shown. A photomicrograph, as shown in FIG. 3A, reveals the microporous structure of the activated carbon polymer composite substrate.

Examples of halogen source include quaternary ammonium halogen compounds, such as, but not limited to, halogen salts, with the following formula:

$(R_1R_2R_3R_4)N^+X$      Formula (1)

where $X=I^-$, $Br^-$, $I_3^-$, $BrI_2^-$, $Br_2I^-$, $Br_3^-$ and $R_1$, $R_2$, $R_3$ and $R_4$ are selected from the group consisting of a hydrocarbon having from about 1 to about 18 carbon atoms. The hydrocarbon may be a simple alkyl, including, but not limited to, linear or branched alkyl.

Halogen source 103 could take many configurations in association with polymeric substrate 101 and sorbent material 102 and is not limited to the configuration depicted in FIG. 2. The halogen compound may be added through simple admixture during the preparation of the sorbent polymer composite. In one or more exemplary embodiment, the halogen compound may be impregnated into the sorbent, adsorbed or ion exchanged. In the case of the tetra-alkyl ammonium iodides and bromides, due to limited solubility, adsorption from solution will provide the highest loading on the sorbent. In the case of the tri-halide derivatives, which are essentially insoluble in water, impregnation or adsorption may be performed using a suitable organic solvent, such as chloroform, dicholoromethane, methanol, isopropanol, ethanol, acetonitrile or the like. Alternatively, the tri-halide can be generated by oxidation of the halide derivative using a suitable oxidizer in the presence of acid as depicted in by reaction 1 & 2:

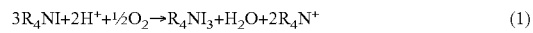
$3R_4NI + 2H^+ + \frac{1}{2}O_2 \rightarrow R_4NI_3 + H_2O + 2R_4N^+$      (1)

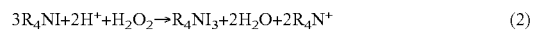
$3R_4NI + 2H^+ + H_2O_2 \rightarrow R_4NI_3 + 2H_2O + 2R_4N^+$      (2)

or the halide derivative with the elemental halogen ($Br_2$ or $I_2$) as depicted by reaction 3:

$R_4NI + I_2 \rightarrow R_4NI_3$      (3)

or the halide derivative with an aqueous solution of $I_3^-$ as depicted by reaction 4:

$R_4NI + I_3^- \rightarrow R_4NI_3 + I^-$      (4)

In reaction 2, other suitable oxidizers may be employed including, but not limited to, hydrogen peroxide, alkali metal persulfate, alkali metal monopersulfate, potassium iodate, potassium monopersulfates, and oxygen may be substituted with the appropriate stoichiometry. Additionally bromine may be used instead of Iodine in any of the reactions (1)-(4) depicted above.

Further suitable compounds for use as an oxidizer include, but are not limited to, iron(III) salts (e.g., Iron (III)halides (chloride, bromide, iodide)), iron (III) nitrate, iron(III) sulfate, iron(III) oxide, and combinations thereof. Iron(III) salts may be formed by reaction 5:

$$2Fe^{+3} + 2I^- \rightarrow 2Fe^{+2} + I_2 \qquad (5)$$

In order to more effectively utilize the tetra-alkyl ammonium cation, an inexpensive halogen source, such as potassium iodide by be substituted for 2 of the tetra-alkyl ammonium halides in Reactions (1) and (2).

Figure 4:
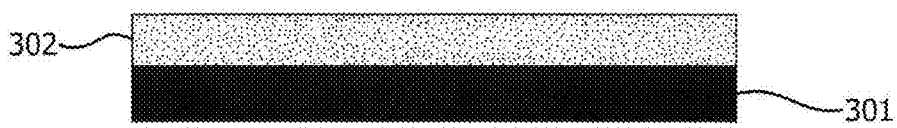
FIG. 4 is an exemplary illustration of a section of durable halide deposits on activated carbon in accordance with at least one embodiment.

FIG. 2 shows an embodiment where the quaternary ammonium halogen compounds Formula (1) 103 partially covers the activated carbon 102. Another embodiment as depicted in FIG. 4 where the quaternary ammonium halogen compounds Formula (1) 302 completely covers segments of the activated carbon 301. Combinations of the material orientations of FIGS. 2, 3 and 4 are within the contemplated scope of the present invention.

It may be surmised that the propensity of a salt to leach from carbon is a function of 1) solubility of the salt in water and acid, and 2) affinity of salt for adsorption to activated carbon.

The relative affinity of a molecule to adsorb on surfaces can be quantified by means of the well-known Langmuir Adsorption Isotherm. In equation below:

$$A(aq) + \text{Site} \underset{}{\overset{K}{\rightleftarrows}} A(ads)$$

If we define A(ads)=θ, and the concentration of surface sites as (1−θ), the equation can be written as $$A(aq) + (1-\theta) \underset{}{\overset{K}{\rightleftarrows}} \theta$$

The equation $$\theta = \frac{KCa}{(1+KCa)}$$

is the Langmuir equation.

In practice it is difficult to measure θ directly. Typically the uptake of adsorbent per gram of carbon is measured. Consequently, we define θ as the ratio of the measured uptake of adsorbent, in g/gram of carbon, divided by a parameter a, which represents the total adsorption capacity in grams/gram of carbon for that that particular adsorbate.

$$\theta = \text{uptake}/a$$

By fitting the Langmuir equation to adsorption data from solution, it is possible to extract the Langmuir equilibrium constant K (hereinafter "$K_{aff}$"), which is a measure of the affinity of a species to be adsorbed, and the parameter a, which represents total adsorption capacity, as noted above. The higher the value of $K_{aff}$ the greater the affinity of the species to reside on the surface, rather than be dissolved in the liquid phase.

Halogen salts employed for mercury capture, such as KI and NaBr are readily soluble in water and have virtually no adsorption on activated carbon. As a result, they are readily leached when used for the abatement of mercury from flue gases where $SO_2$ is abundant.

The compounds described herein, when compared to KI and NaBr, were found to have significant adsorption on activated carbon and consequently could be expected to have improved resistance to leaching in use. During the investigation of alkyl quaternary ammonium salts, it was found that not all salts behaved equivalently. In particular, it was found that (1) iodide salts had a greater $K_{aff}$ than bromide salts, and (2) that increasing the carbon length of the alkyl groups also resulted in greater affinity for carbon, as measured by the increasing $K_{aff}$. Hence it was found that although all tetra-alkyl ammonium iodides and bromides were effective at increasing the effectiveness of activated carbon to remove mercury and oxidize $SO_2$, tetra-butyl ammonium was particularly effective and resistant to leaching. Table 1 shows values for $K_{aff}$ some of exemplary compounds.

TABLE 1

| Material* | $K_{aff}$ | a (g adsorbent/g carbon) | Activated Carbon type |
|---|---|---|---|
| TBAI | 191 | 0.571 | Wood (SA20) |
| TBAI | 952 | 0.265 | Coal (PAC20-BF) |
| TPAI | 92 | 0.464 | Wood (SA20) |
| TEAI | 26 | 0.373 | Wood (SA20) |
| DTMABr | 226 | 0.7 | Wood (SA20) |
| TBABr | 69 | 0.440 | Wood (SA20) |
| TBABr | 346 | 0.195 | Coal (PAC20-BF) |

*TBAI = $(C_4H_9)_4NI$; TPAI = $(C_3H_7)_4NI$, TEAI = $(C_2H_5)_4NI$, DTMABr = $(C_{12}H_{25})(CH_3)_3NBr$, TBABr = $(C_4H_9)_4NBr$

It was surprisingly found that under appropriate conditions, it is possible to convert tetra-alkyl ammonium bromide and tetra-alkyl ammonium iodide adsorbed on carbon to the tri-halide derivatives. Tetra-alkyl ammonium tri-halides are sparingly soluble in water and acid, but exceedingly reactive to mercury and toward the oxidation $SO_2$ to sulfuric acid. Tri-halides supported on activated carbon are especially resistant to leaching, while still providing excellent mercury capture efficiency. The preparation of tetra-alkyl ammonium tri-halides supported on activated carbon have not previously been reported.

Figure 5:
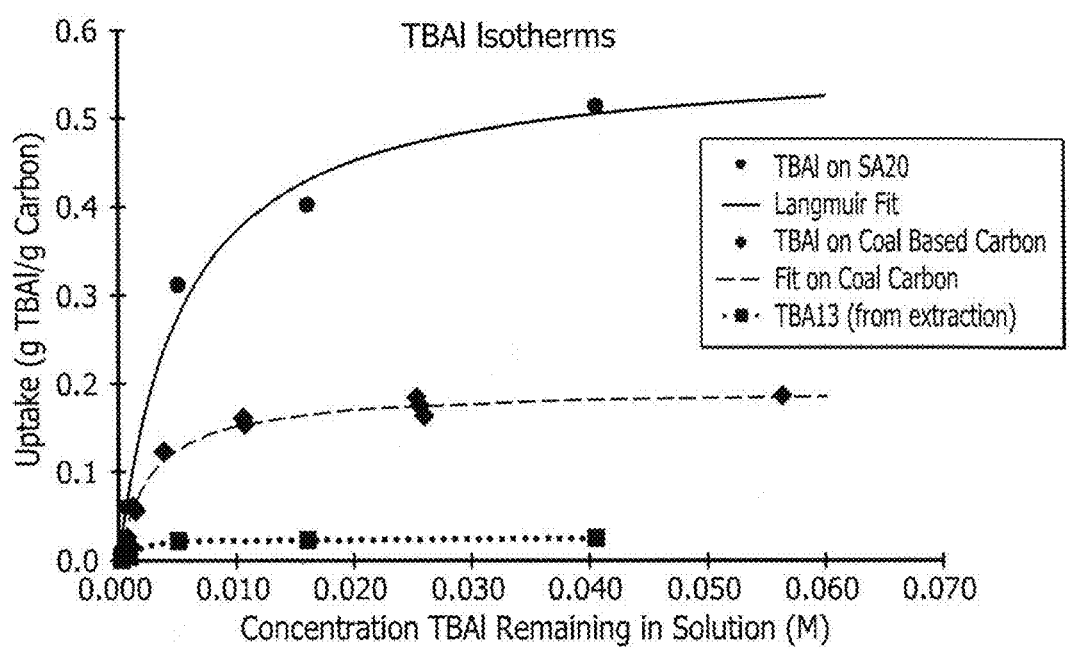
FIG. 5 is an illustration of a tetrabutylammonium iodide (TBAI) isotherm as described in Examples 1 and 2.

FIG. 5 (Examples 1 and 2) shows the Langmuir Adsorption isotherms of tetrabutylammonium iodide (hereinafter "TBAI") from aqueous solutions on wood and coal derived carbons. While essentially no potassium iodide is adsorbed from aqueous solutions on these carbons, the isotherms show that TBAI has a strong affinity for both wood and coal derived carbons, thereby providing a better durability to loss by leaching. FIG. 5 further shows that a portion of TBAI is converted to the tri-iodide derivative simply by adsorption on wood carbon. Such a conversion was not observed on coal derived carbon. It is to be noted that conditions are present on wood based carbon (e.g. acidity and/or oxidation sites) that can convert TBAI to the tri-iodide.

Figure 6:
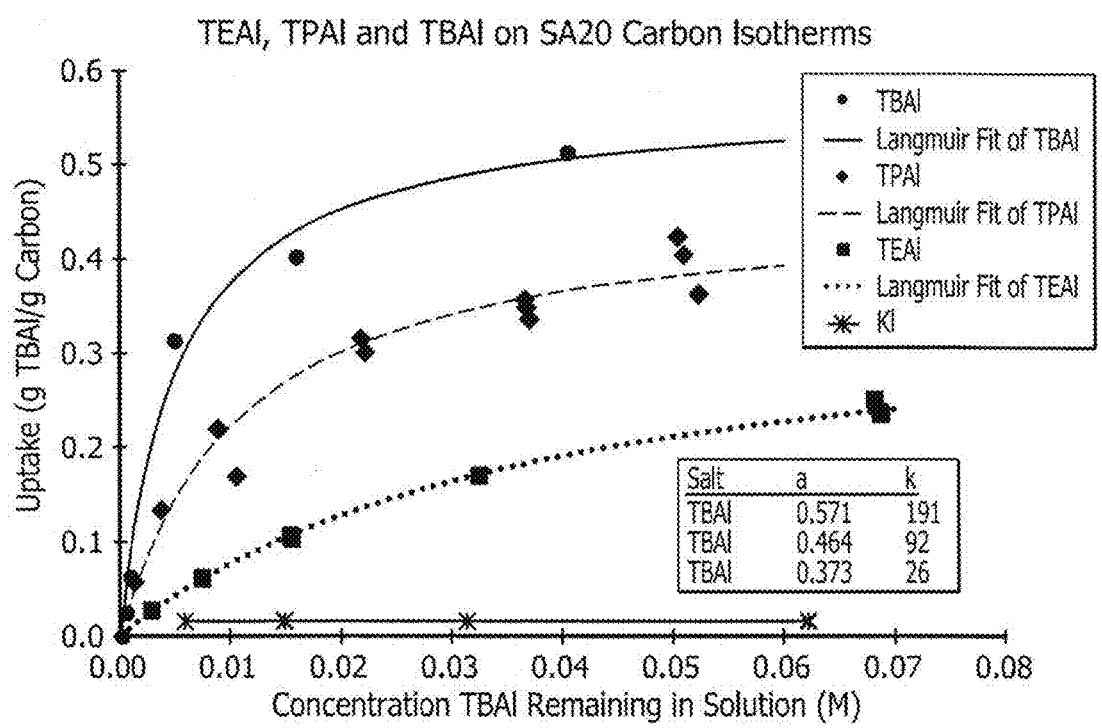
FIG. 6 is an illustration of a tetraalkylammonium iodide isotherm on wood based activated carbon as described in Examples 1, 3 and 4.

FIG. 6 (Examples 1, 3, and 4) shows the Langmuir Adsorption isotherms from aqueous solutions of tetraalkylammonium iodides of varying chain length. Specifically, the isotherms from an aqueous solution for tetraethylammonium (alkyl chain length=2 carbons), tetrapropylammonium iodide (alkyl chain 3 carbons), and tetrabutylammonium iodide (alkyl chain length=4 carbons) on wood derived carbon are shown. It is clear from FIG. 6 that as the alkyl chain length increases from two to four carbons, the affinity for the carbon increases and provides improved durability to loss by leaching.

Figure 7:
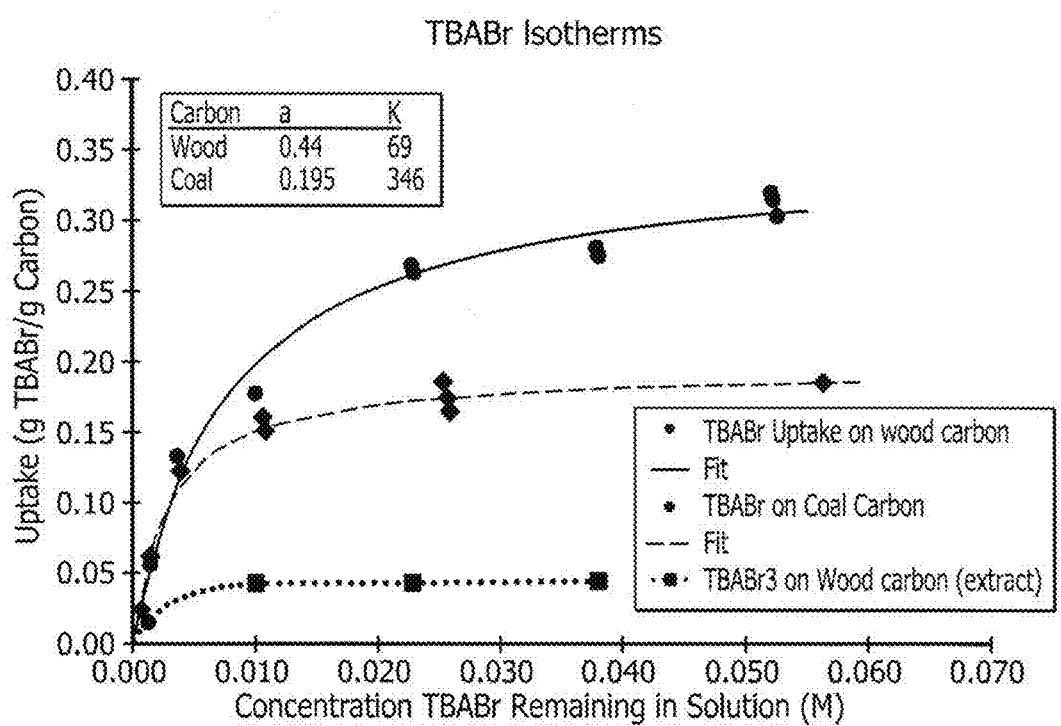
FIG. 7 is an illustration of a tetraalkylammonium bromide isotherm on wood based activated carbon as described in Examples 5, 6 and 7.

FIG. 7 (Examples 5 and 6) shows the Langmuir Adsorption isotherms of tetrabutylammonium bromide (hereafter "TBABr") from aqueous solutions of wood and coal derived carbon. While essentially no sodium bromide is adsorbed from the aqueous solutions of these carbons, the isotherms show that TBABr has a strong affinity for both wood and coal based carbons, thereby providing better durability to loss by leaching. FIG. 7 further shows that a portion of TBABr was converted to the tri-halide derivative simply by adsorption on wood carbon. Such a conversion was not observed for coal derived carbon. It is to be noted that conditions are present on wood based carbon that can convert TBABr to the tri-bromide form (e.g. acidity and/or oxidation sites).

In certain embodiments, sorbent polymer composites comprise a high surface area material imbibed or mixed in a polymer with a low surface energy such as polytetrafluoroethylene. Examples of high surface area materials include activated carbons (e.g., activated carbons derived from coal, lignite, wood, coconut shell and other carbonaceous materials), silica gel, and zeolite.

It is also contemplated to be within the scope of the present invention to include durable halide source(s), such as quaternary ammonium halides and/or tri-halides, which are both resistant to leaching by water and $H_2SO_4$, and which have a high affinity for activated carbon.

TEST METHODS

It should be understood that although certain methods and equipment are described below, other methods or equipment determined suitable by one of ordinary skill in the art may be alternatively utilized.

Adsorption Test Method 1 gram aliquots of the carbon to be tested were added to 100 ml solutions containing variable starting concentrations of the specified halide salt dissolved in deionized water. The variable starting concentrations were nominally 0.1, 0.25, 0.5, 1.0 and 2.0 wt %. After 15 minutes of stirring, the slurries were filtered and re-analyzed for iodide content by means of Fajan's titration (As described in Harris, Quantitative Analysis, $6^{th}$ Ed., W.H. Freeman & Co, NY, p142-143). Results were reported in terms of uptake weight ratio (g/g of carbon) versus concentration of residual adsorbate. Data was fitted to the Langmuir Adsorption equation to extract an equilibrium constant $K_{aff}$ and a total capacity "a".

Test for Presence of Trihalides

Following the adsorption test described above, a small portion of the air dried carbon filter cake (typically 0.1 gram) was extracted with 10 ml of spectrophotometric grade dichloromethane. The concentration of triiodide in the extract was determined from the absorbance at 295 and 365 nm using a UV-visible spectrometer, Concentration was determined by comparison with a calibration curve. The calibration curve consisted of absorbance (at 295 and 365 nm) vs. concentration from standards made from tetrabutylammonium triiodide standards in dichloromethane (nominally 2-40 part per million by weight). Results were reported in g $TBAI_3$ extracted per gram of carbon. Similarly, tri-bromide was determined from the absorbance at 230 nm using a UV-visible spectrophotometer. In this case, adsorption vs concentration calibration curves were prepared using tetrabutylammonium tribromide standards (nominally 50-200 parts per million by weight).

Test for Mercury Removal

Tests for mercury removal were performed using an apparatus consisting of (1) a supply of air regulated by a mass flow controller (2) a mercury source produced by means a small nitrogen purge through of a Dynacalibrator (VICI) containing a mercury permeation tube (3) a sample cell fitted with a bypass, and located in an oven maintained at 65° C. and (4) A stannous chloride/H2SO4 bubbler to convert any oxidized mercury to elemental mercury and (5) mercury detection by means of Zeeman effect atomic adsorption mercury analyzer (Ohio Lumex), equipped with a short path length gas cell. Efficiency is reported as the difference between inlet mercury levels (bypassing the sample) and outlet levels (passing through the sample).

$$\% \text{ Efficiency} = \frac{\text{Concentration(inlet)} - \text{Concentration (outlet)}}{\text{Concentration(inlet)}} \times 100$$

EXAMPLES

Comparative Example 1

Adsorption of Potassium Iodide (KI) on Wood Based Activated Carbon 1 gram aliquots of activated wood carbon (Westvaco, NUCHAR SA20) were added to 100 ml solutions containing variable starting concentrations of potassium iodide (Aldrich) dissolved in deionized water. After 15 minutes of stirring, the slurries were filtered and re-analyzed for iodide content by means of Fajan's titration (As described in Harris, Quantitative Analysis, $6^{th}$ Ed., W.H. Freeman & Co, NY, p142-143). Essentially no uptake of potassium iodide was observed within the precision of the analysis (detection limit=0.03 g KI/g carbon)

Example 1

Adsorption of Tetrabutylammonium Iodide TBAI on Wood Based Activated Carbon 1 gram aliquots of activated wood carbon (Westvaco, NUCHAR SA20) were added to 100 ml solutions containing variable starting concentrations of TBAI (Aldrich) dissolved in, deionized water. After 15 minutes of stirring, the slurries were filtered and re-analyzed for iodide content by means of Fajan's titration. Dried filter cakes from the adsorption experiment were subsequently extracted with 10 ml of methylene chloride. Peaks at 295 nm and 365 nm, attributable to $I_3^-$, were observed in the UV spectrum of extracts. Results are shown in Table 1 and FIG. 5.

Example 2

Adsorption of Tetrabutylammonium Iodide (TBAI) on Coal Based Activated Carbon 1 gram aliquots of activated coal carbon (NORIT, PAC20-BF) were added to 100 ml solutions containing variable starting concentrations of TBAI (Aldrich) dissolved in deionized water. After 15 minutes of stirring, the slurries were filtered and re-analyzed for iodide content by means of Fajan's titration. Dried filter cakes from the adsorption experiment were subsequently extracted with 10 ml of methylene chloride. No peaks at 295 nm and 365 nm, attributable to $I_3^-$, were observed in the UV spectrum of extracts. Results are shown in Table 1 and FIG. 5.

Example 3

Adsorption of Tetraethylammonium Iodide (TEAI) on Wood Based Activated Carbon 1 gram aliquots of activated wood carbon (Westvaco, NUCHAR SA20) were added to 100 ml solutions containing variable starting concentrations of tetraethylammonium iodide (Aldrich) dissolved in deionized water. After 15 minutes of stirring, the slurries were filtered and re-analyzed for iodide content by means of Fajan's titration. Results are shown in Table 1 and FIG. 6.

Example 4

Adsorption of Tetrapropylammonium Iodide (TPAI) on Wood Based Activated Carbon 1 gram aliquots of activated wood carbon (Westvaco, NUCHAR SA20) were added to 100 ml solutions containing variable starting concentrations of tetrapropylammonium iodide (Aldrich) dissolved in deionized water. After 15 minutes of stirring, the slurries were filtered and re-analyzed for iodide content by means of Fajen's titration. Results are shown in Table 1 and FIG. 6.

Example 5

Adsorption of Tetrabutylammonium Bromide (TBABr) on Wood Carbon 1 gram aliquots of activated wood carbon (Westvaco, NUCHAR SA20) were added to 100 ml solutions containing variable starting concentrations of TBABr (Aldrich) dissolved in deionized water. After 15 minutes of stirring, the slurries were filtered and re-analyzed for bromide content by means of Fajan's titration, Dried filter cakes from the adsorption experiment were subsequently extracted with 10 ml of methylene chloride. Peaks at 230 nm, attributable to $Br_3^-$, were observed in the UV spectrum of extracts. Results are shown in Table 1 and FIG. 7.

Example 6

Adsorption of TBABr on Coal Carbon 1 gram aliquots of activated coal carbon (NORIT, PAC20-BF) were added to 100 ml solutions containing variable starting concentrations of TBABr (Aldrich) dissolved in deionized water. After 15 minutes of stirring, the slurries were filtered and re-analyzed for bromide content by means of Fajan's titration. Results are shown in Table 1 and FIG. 7.

Example 7

Adsorption of Dodecyltriethylammonium (DTMABr) on Wood Carbon 1 gram aliquots of activated carbon (Westvaco NUCHAR SA20) were added to 100 ml solutions containing variable starting concentrations of dodecyltriethylammonium bromide (Aldrich) dissolved in deionized water. After 15 minutes of stirring, the slurries were filtered and re-analyzed for bromide content by means of Fajan's titration. Results are shown in Table 1.

Example 8

Reaction of TBAI in Water with Mercury

A 1 wt % TBAI solution, prepared by dissolving 0.12 grams of TBAI (Aldrich) in 12 ml of deionized water, was added to a mini-impinger. A gas stream consisting of ~2 slpm of air containing ~600 ug/m³ of mercury was passed through the impinger. Little if any change in mercury concentration was observed.

Example 9

Reaction of TBAI with Sulfuric Acid

A 2 wt % TBAI solution, prepared by dissolving 2.0 grams of TBAI (Aldrich) in 100 ml of 1N sulfuric acid (J. T. Baker), was allowed to stand for several days. The solution became turbid after about 30 minutes, and a precipitate developed overnight. After a few days black crystals were recovered from the solution. Elemental analysis revealed that these crystals were tetrabutylammonium tri-iodide.

Example 10

Reaction of TBAI in 1N Sulfuric Acid with Mercury

A 1 wt % TBAI solution, prepared by dissolving 0.12 grams of TBAI (Aldrich) in 12 ml of 1N sulfuric acid (J. T. Baker), was added to a mini-impinger. A gas stream consisting of ~2 slpm of air containing ~600 ug/m³ of mercury was passed through the impinger. ~37% mercury removal efficiency was observed. Essentially no mercury removal was observed with 1N sulfuric acid under similar conditions. Reaction of mercury with TBAI in acid is attributed to the presence of tetrabutylammonium tri-iodide under acidic conditions, as demonstrated by Example 9.

Example 11

Reaction of Tetrabutylammonium Tri-Iodide with Mercury

Pure tetrabutylammonium tri-iodide was synthesized by reaction of 5.4 millimoles of TBAI (Aldrich) dissolved in water with 5.4 milliequivalents of iodine from a 0.1N iodine solution (prepared using 12.71 g iodine (Aldrich) and 19.10 g potassium iodide (Aldrich) dissolved in 1 liter of deionized water). An immediate black precipitate was obtained. After stirring 3 hours to age the precipitate, it was filtered and recrystallized from methanol solution. Elemental analysis was in good agreement with $[(C_4H_9)_4N]I_3$. 10 ml of a 0.1 wt % solution of tetrabutylammonium tri-iodide in methanol was added to a mini-impinger. A gas stream consisting of 2 slpm of air containing ~600 ug/m³ of mercury was passed through the impinger. 100% mercury removal was observed. Essentially no mercury removal was observed in a control using methanol alone.

Comparative Example 2

Removal of Mercury by Powdered Activated Carbon 100 mg of activated carbon (Nuchar SA20) was mixed well with 10 ml of sand. 2.5 ml of this mixture were charged to a 1 cm×1 cm cell, supported on both sides by glass wool. 1 slpm of air containing nominally 200 ug Hg/m³ was passed over the sample. ~6-7% mercury removal efficiency was observed after 2 hours.

Example 12

Removal of Mercury by TBAI Impregnated Wood Carbon

A sample of 10 grams of activated carbon (Nuchar SA20) was impregnated with 12 grams of an aqueous solution containing 0.1075 g of TBAI (Aldrich) using the incipient wetness technique. The sample was dried at 120° C. for 1 hour.

100 mg of the resulting TSAI impregnated carbon was mixed well with 10 ml of sand. 2.5 ml of this mixture were charged to a 1 cm×1 CM cell, supported on both sides by glass wool. 1 slpm of air containing nominally 200 ug Hg/m³ was passed over the sample, 100% mercury removal efficiency was observed for ~1 hours. After this point, breakthrough was relatively rapid.

Example 13

Removal of Mercury by TBAI Impregnated Carbon Treated with Sulfuric Acid 10 grams of activated carbon (Nuchar SA20) was stirred overnight in a solution containing 0.2 g of TBAI (Aldrich) dissolved in 1N sulfuric acid (Aldrich). As shown in examples 8 and 9, reaction of TBAI in the presence of acid is expected to produce tetrabutylammonium tri-iodide.

100 mg of TBAI/Sulfuric acid treated carbon was mixed well with 10 ml of sand. 2.5 ml of this mixture was charged to a 1 cm×1 cm cell, supported on both sides by glass wool. 1 slpm of air containing nominally 200 ug Hg/m³ was passed over the sample. 100% mercury removal efficiency was obtained. At the conclusion of 3 hours of testing, mercury removal efficiency was still in excess of 90%.

Example 14

Mercury Removal by TBAI Adsorbed on Activated Carbon 1 gram of activated carbon (Nuchar SA20) was added to 0.37 g of TBAI dissolved in 50 ml of DI water. The solution was allowed to stir for 15 minutes, then filtered and the carbon was dried at 65° C.

100 mg of carbon containing adsorbed TBAI was mixed well with 10 ml of sand. 2.5 ml of this mixture was charged to a 1 cm×1 cm cell, supported on both sides by glass wool. 1 slpm of air containing nominally 200 ug/m³ was passed over the sample. The sample was run for a period of two days. 100% mercury removal efficiency was observed on day 1. At the start of day 2 (20 hours) the efficiency was 91%. Subsequently breakthrough was gradually observed. Analysis of the mercury content of the used carbon/sand mixture gave a total mercury uptake of ~1.0 g Hg/gram C over the course of the test (run to near complete breakthrough).

Example 15

Mercury Removal by TBAI Adsorbed on Activated Carbon-Treated with Acidic Hydrogen Peroxide 1 gram of activated carbon (Nuchar SA20) was added to 0.37 g of TBAI dissolved in 50 ml of DI water. The solution was allowed to stir for 15 minutes. The carbon was filtered and re-slurried with 50 ml of 1N sulfuric acid (J. T. Baker) and 0.335 ml of 3% hydrogen peroxide (Vi-Jon). Hydrogen peroxide is expected to convert TBAI to tetrabutylammonium tri-iodide by the reaction

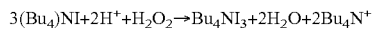

$3(Bu_4)NI + 2H^+ + H_2O_2 \rightarrow Bu_4NI_3 + 2H_2O + 2Bu_4N^+$

The carbon, so treated, was filtered and dried at 65° C. for 1 hour.

100 mg of the resulting carbon containing adsorbed TBAI treated with acidic hydrogen peroxide was mixed well with 10 ml of sand. 2.5 ml of this mixture was charged to a 1 cm×1 cm cell, supported on both sides by glass wool. 1 slpm of air containing nominally 200 ug Hg/m3 was passed over the sample. The sample was run for a period of 3 days. 100% mercury removal efficiency was maintained over a period of ~30 hours. At the start of day 3 (48 hours) the efficiency was 57%. Subsequently breakthrough was gradually observed.

Analysis of the mercury content of the used carbon/sand mixture gave a total mercury uptake of ~1.3 g Hg/gram C over the course of the test (run to near complete breakthrough).

Example 16

Mercury Removal by Tetrabutylammonium Tri-Iodide Adsorbed on Wood Based Activated Carbon 0.74 grams TBAI (Aldrich) 0.56 g KI (Aldrich) and 0.1475 grams KIO₃ (Aldrich) were added to 50 ml of 10% sulfuric acid (JTBAKER). This resulted in an immediate precipitate, which was allowed to age for 3 hours with stirring. The precipitate was filtered and a portion recrystallized from methanol to yield black needle like crystals. The elemental analysis was consistent with $[(C_4H_9)_4N]I_3$. ~0.25 g of the resulting TBAI₃ dissolved in 50 ml of methanol was stirred with 1 gram of activated carbon Westvaco NUCHAR SA20). The slurry was stirred for 15 minutes then filtered and dried at 65° C. for 30 minutes.

100 mg of the resulting carbon containing TBAI₃ was mixed well with 10 ml of sand. 2.5 ml of this mixture was charged to a 1 cm×1 cm cell, supported on both sides by glass wool. 1 slpm of air containing nominally 200 ug Hg/m³ was passed over the sample. The sample was run for a total of 3 days. 100% mercury removal efficiency was maintained over a period of 27 hours. At the start of day 3 (44.5 hours) the efficiency was ~11%. Analysis of the mercury content of the used carbon/sand mixture gave a total mercury uptake of ~1.0 g Hg/gram C over the course of the test (run to near complete breakthrough).

Example 17

Mercury Removal by Tetrabutylammonium Bromide (TBABr) Adsorbed on Wood Based Activated Carbon 2 grams of activated carbon (Nuchar SA20) was added to 2 grams of TBAI dissolved in 100 ml of DI water. The solution was allowed to stir for 15 minutes, then filtered and the carbon was dried at 65° C.

100 mg of carbon containing adsorbed TBABr was mixed well with 10 ml of sand. 2.5 ml of this mixture was charged to a 1 cm×1 cm cell, supported on both sides by glass wool. 1 slpm of air containing nominally 200 ug Hg/m³ was passed over the sample. The sample was run for a period of two days. 100% mercury removal efficiency was observed on day 1. On day 2 (24 hours) the efficiency was 80%. Subsequently breakthrough was gradually observed. Analysis of the mercury content of the used carbon/sand mixture gave a total mercury uptake of ~0.75 g Hg/gram C over the course of the test (run to near complete breakthrough).

Comparative Example 3

Mercury Removal by Carbon/PTFE Tape

A 10 mm×150 mm strip of carbon-PTFE tape (made as described in the '352 patent) was placed in a 10 mm×10 mm cell in an oven maintained at 65° C. and exposed to 10 slpm of air containing 100 ug/m3 of mercury for 30 minutes. The mercury removal efficiency was 13.1%.

Example 18

Mercury Removal by TBAI3 on Carbon/PTFE Tape

A 10 mm×150 mm strip of carbon-PTFE tape (made as described in the '352 patent) was treated for 15 minutes with a solution containing 100 mg of TBAI3 dissolved in 2.5 ml chloroform. This tape was dried at ambient temperature under vacuum, then placed in a 10 mm×10 mm cell in an oven maintained at 65° C. and exposed to 10 slpm of air containing 100 ug/m3 of mercury for 30 minutes. The mercury removal efficiency was 35.0%.

Example 19

Mercury Removal by TBA-I$_2$Br on Carbon/PTFE Tape

TBA-I$_2$Br was synthesized by direct reaction of 0.64 g of TBABr (Aldrich) with 0.50 grams elemental iodine (Aldrich) in a solution of IPA. The product was filtered and dried in a desiccator.

A 10 mm×150 mm strip of carbon-PTFE tape made as described in U.S. Pat. No. 7,442,352 B2, was treated for 15 minutes with a solution containing 100 mg of TBAI2Br dissolved in 2.5 ml, chloroform (Aldrich). This tape was dried at ambient temperature under vacuum, then placed in a 10 mm×10 mm cell in an oven maintained at 65° C. and exposed to 10 slpm of air containing 100 ug/m3 of mercury for 30 minutes. The mercury removal efficiency was 33.3%.

Example 20

Mercury Removal by TBA-IBr$_2$ on Carbon/PTFE Tape

TBA-IBr2 was synthesized by direct reaction of 1.0 g TBAI (Aldrich) with 32 ml of elemental bromine (Aldrich) dissolved in water (0.196N solution). The product was filtered and dried in a desiccator.

A 10 mm×150 mm strip of carbon-PTFE tape made as described in the '352 patent, was treated for 15 minutes with a solution containing 100 mg of TBAIBr$_2$ dissolved in 2.5 ml chloroform (Aldrich). This tape was dried at ambient temperature under vacuum, then placed in a 10 mm×10 mm cell in an oven maintained at 65° C. and exposed to 10 slpm of air containing 100 ug/m3 of mercury for 30 minutes. The mercury removal efficiency was 35.1%.

Example 21

Mercury Removal by TBA-Br$_3$ on Carbon/PTFE Tape

TBA-Br$_3$ was synthesized by direct reaction of 0.5 g TBABr (Aldrich) with elemental bromine (Aldrich) dissolved in water (0.105N). The resulting product was filtered and dried in a desiccator.

A 10 mm×150 mm strip of carbon-PTFE tape made as described in U.S. Pat. No. 7,442,352 B2, was treated for 15 minutes with a solution containing 200 mg of TBAIBr$_2$ dissolved in 2.5 ml chloroform. This tape was dried at ambient temperature under vacuum, then placed in a 10 mm×10 mm cell in an oven maintained at 65° C. and exposed to 10 slpm of air containing 100 ug/m3 of mercury for 30 minutes. The mercury removal efficiency was 34.4%.

Example 22

Mercury Removal by Dodecyltriethylammonium Tri-Bromide on Carbon/PTFE Tape 0.617 grams Dodecyltriethylammonium bromide (Aldrich) was dissolved in 50 ml of deionized water. This was reacted with 57 ml of bromine (Aldrich) dissolved in water (0.072N), The resulting yellow precipitate was stirred for 30 minutes and then filtered and dried under vacuum in a dessicator. The product, dodecyltriethylammonium tri-bromide, was used without further purification.

A 10 mm×150 mm strip of carbon-PTFE tape made as described in U.S. Pat. No. 7,442,352 B2, was treated for 15 minutes with a solution containing 100 mg of the dodecyltriethylammonium tri-bromide dissolved in 2.5 ml chloroform (Aldrich). This tape was dried at ambient temperature under vacuum, then placed in a 10 mm×10 mm cell in an oven maintained at 65° C. and exposed to 10 slpm of air containing 100 ug/m3 of mercury for 30 minutes. The mercury removal efficiency was 41.2%.

Comparative Example 4

SO$_2$ Oxidation by Wood Based Carbon 50 mg of activated carbon (Nuchar SA20) powder (10-25 microns) was packed into a cylindrical column, 100 sccm of air containing nominally 200 ppmv SO$_2$ was passed over the sample with 50% RH at 25° C. About 10% SO$_2$ removal efficiency was observed after 60 minutes.

Example 23

SO$_2$ Oxidation by TBAI Treated Wood Carbon grams of TBAI is dissolved into 100 cc DI water. 2 grams of wood based carbon (Nuchar SA20) powder (10-25 microns) was mixed with the solution and stirred for 24 hours. The excess water is vaporized at 90° C., and the sample was dried at 110° C.

50 mg of such TBAI impregnated activated carbon powder was packed into a cylindrical column. 100 sccm of air containing nominally 200 ppmv SO$_2$ was passed over the sample with 50% RH at 25° C.~99.9% SO$_2$ removal efficiency was observed after 60 minutes.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

The invention claimed is:

1. A flue gas treatment device, comprising:
   a sorbent polymer composite substrate comprising a high surface area support, and
   a tri-halide halogen source adjacent said sorbent polymer composite substrate,
   wherein said halogen source has a Langmuir equilibrium constant greater than 10.

2. The flue gas treatment device of claim 1, wherein, said high surface area support comprises a member selected from the group consisting of activated carbon, silica gel, zeolite and combinations thereof.

3. The flue gas treatment device of claim 2, wherein said activated carbon is selected from the group consisting of a coal-based carbon, and wood-based carbon and a coconut-based carbon.

4. The flue gas treatment device of claim 2, wherein said activated carbon is derived from a carbonaceous material.

5. The flue gas treatment device of claim 1, wherein said tri-halide halogen source is tetrabutylammonium tri-iodide.

6. The flue gas treatment device of claim 1, wherein said tri-halide halogen source is tetrabutylammonium tri-bromide.

7. The flue gas treatment device of claim 1, said halogen source comprising a compound with a formula: N(R$_1$R$_2$R$_3$R$_4$)X, wherein N is nitrogen and X=I$_3^-$, BrI $_2^-$, $BrI_2^-$, or $Br_3^-$ and wherein $R_1$, $R_2$, $R_3$ and $R_4$ are selected from the group consisting of a hydrocarbon having from 1 to 18 carbon atoms.

8. The flue gas treatment device of claim 1, wherein said polymer of said sorbent polymer composite substrate comprises PTFE.

9. A flue gas treatment device, comprising:
a sorbent polymer composite substrate comprising a high surface area support, and
a tri-halide halogen source adjacent said sorbent polymer composite substrate, said halogen source comprising tetrabutylammonium halogen salt and wherein the halogen is selected from the group $I_3^-$, $BrI_2^-$, $Br_2I^-$, and $Br_3^-$.

10. A flue gas treatment device, comprising:
a sorbent polymer composite substrate comprising a high surface area support, and
a tri-halide halogen source adjacent said sorbent polymer composite substrate, said halogen source comprising a compound with a formula: $N(R_1R_2R_3R_4)X$, wherein $X=I_3^-$, $BrI_2^-$, $Br_2I^-$, or $Br_3^-$ and wherein $R_1$, $R_2$, $R_3$ and $R_4$ are selected from the group consisting of a hydrocarbon having from 1 to 18 carbon atoms where the hydrocarbon is an alkyl.

11. The flue gas treatment device of claim 10, wherein said tri-halide halogen source has a Langmuir equilibrium constant of greater than 10.

12. The flue, gas treatment device of claim 10, wherein said high surface area support comprises a member selected from the group consisting of activated carbon silica gel, zeolite and combinations thereof.

13. The flue gas treatment device of claim 10, wherein said activated carbon is selected from the group consisting of a coal-based carbon, and wood-based carbon and a coconut-based carbon.

14. The flue gas treatment device of claim 13, wherein said activated carbon is derived from a carbonaceous material.

15. The flue gas treatment device of claim 10, wherein said tri-halide halogen source is tetrabutylammonium tri-iodide.

16. The flue gas treatment device of claim 10, wherein said tri-halide halogen source is tetrabutylammonium tri-bromide.

17. The flue gas treatment device of claim 10, wherein said alkyl contains from 4 to 6 carbon atoms.

18. The flue gas treatment device of claim 10, wherein $X=BrI_2^-$ or $Br_2I$.

19. The flue gas treatment device of claim 10, wherein said polymer composite comprises PTFE.

20. A flue gas treatment device, comprising:
a sorbent polymer composite substrate comprising a high surface area support, and a tri-halide halogen source adjacent said sorbent polymer composite substrate, said halogen source comprising a compound with a formula: $N(R_1R_2R_3R_4)X$, wherein X is a tri-halide and wherein said tri-halide is formed from its halide precursor by acid treatment in the presence of an oxidizer, and wherein $R_1$, $R_2$, $R_3$ and $R_4$ are selected from the group consisting of a hydrocarbon having from 1 to 18 carbon atoms.

21. The flue gas treatment device of claim 20, wherein said hydrocarbon is an alkyl.

22. The flue gas treatment device of claim 20 wherein said oxidizer is selected from a group consisting of hydrogen, peroxide, an alkali metal persulfate, an alkali metal monopersulfate, potassium iodate, oxygen, iron(III) salts, iron (III) nitrate, iron(III) sulfate, iron(III) oxide and combinations thereof.

23. The flue, gas treatment device of claim 20 wherein said acid is produced by oxidation of $SO_2$ in the flue gas.

24. A process for removing sulfur oxides and mercury vapor from a gas stream comprising the following steps:
passing said gas stream containing sulfur oxides and mercury vapor over a sorbent polymer composite substrate and a tri-halide halogen source in the presence of oxygen and water vapor, said sorbent polymer composite substrate comprising a high surface area support, and said tri-halide halogen source being adjacent said sorbent polymer composite substrate, wherein said tri-halide halogen source has a Langmuir equilibrium constant greater than 10;
reacting said sulfur oxides with said oxygen and water vapor on said sorbent polymer composite substrate to form sulfuric acid; and
reacting said mercury vapor with said tri-halide halogen source and chemically adsorbing and fixing molecules of said mercury vapor on said sorbent polymer composite substrate.

25. The process of claim 24, wherein said water vapor is added to said gas as stream upstream of said sorbent polymer composite substrate.

26. A process for removing sulfur oxides and mercury vapor from a flue gas stream comprising the steps of:
passing said gas stream containing sulfur oxides and mercury vapor over a sorbent polymer composite substrate and a tri-halide halogen source in the presence of oxygen and water vapor, said sorbent polymer composite substrate comprising a high surface area support, and said halogen source being adjacent said sorbent polymer composite substrate, wherein said halogen source has a formula: $N(R_1R_2R_3R_4)X$, wherein N is nitrogen, and $X=I_3^-$, $BrI_2^-$, $Br_2I^-$, or $Br_3^-$ and wherein $R_1$, $R_2$, $R_3$ and $R_4$ are selected from the group consisting of a hydrocarbon having from about 1 to about 18 carbon atoms and the hydrocarbon is an alkyl;
reacting said sulfur oxides with said oxygen and water vapor on said sorbent polymer composite substrate to form sulfuric acid; and
reacting said mercury vapor with said halogen source and chemically adsorbing and fixing molecules of said mercury vapor on said sorbent polymer composite substrate.

27. The process of claim 26, wherein said water vapor is added to said gas stream upstream of said sorbent polymer composite substrate.

28. The process for treating flue gas of claim 26, wherein the tri-halide halogen source is a halide that is converted to a tri-halide in the presence of sulfuric acid and an oxidizer.

29. The process for treating flue gas of claim 28, wherein said oxidizer is selected from the group consisting of hydrogen peroxide, alkali metal persulfate, alkali metal monopersulfate, potassium iodate, oxygen, iron(III) salts, iron (III) nitrate, iron(III) sulfate, iron(III) oxide and combinations thereof.

30. The process for treating flue gas of claim 28, wherein said acid is produced by oxidation of $SO_2$ in the flue gas.

31. The process for treating flue gas of claim 28, wherein said polymer composite comprises PTFE.

32. The process for treating flue gas of claim 28, wherein said high surface area support comprises a member selected from the group consisting of activated carbon silica gel, zeolite and combinations thereof.

33. The process for treating flue gas of claim 28, wherein said activated carbon is selected from the group consisting of a coal-based carbon, and wood-based carbon and a coconut-based carbon.

34. The process for treating flue gas of claim 28, wherein said activated carbon is derived from a carbonaceous material.

* * * * *